United States Patent
Thomas (10) Patent No.: US 7,721,761 B2
(45) Date of Patent: May 25, 2010

(54) DIVERTER INTEGRATED INTO A SIDE SPRAYER

(75) Inventor: Kurt Judson Thomas, Indianapolis, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 380 days.

(21) Appl. No.: 11/700,795

(22) Filed: Jan. 31, 2007

(65) Prior Publication Data

US 2008/0178935 A1 Jul. 31, 2008

(51) Int. Cl.
*F16K 11/02* (2006.01)
(52) U.S. Cl. .................................. 137/597; 137/119.04
(58) Field of Classification Search ............ 137/119.03, 137/119.04, 597, 544
See application file for complete search history.

(56) References Cited

U.S. PATENT DOCUMENTS

| | | | |
|---|---|---|---|
| 3,336,935 A * | 8/1967 | Ward et al. ............ | 137/119.04 |
| 3,459,207 A | 8/1969 | Bacheller | |
| 3,520,325 A | 7/1970 | Stuart | |
| 3,600,723 A | 8/1971 | Mongerson et al. | |
| 3,620,254 A | 11/1971 | Mongerson et al. | |
| 3,757,824 A | 9/1973 | Parkhurst | |
| 3,796,380 A | 3/1974 | Johnson et al. | |
| 3,835,887 A | 9/1974 | Mongerson et al. | |
| 3,998,240 A | 12/1976 | Liautaud | |
| 4,026,328 A | 5/1977 | Nelson | |
| 4,076,279 A | 2/1978 | Klotz et al. | |
| 4,103,709 A | 8/1978 | Fischer | |
| 4,337,795 A | 7/1982 | Argyris et al. | |
| 4,356,574 A | 11/1982 | Johnson | |
| 4,387,738 A | 6/1983 | Bisonaya et al. | |
| 4,458,839 A | 7/1984 | MacDonald | |
| 4,513,769 A | 4/1985 | Purcell | |
| 4,552,171 A | 11/1985 | Farrell et al. | |
| 4,577,653 A | 3/1986 | Marty | |
| 4,607,659 A | 8/1986 | Cole | |
| 4,609,006 A | 9/1986 | Parkinson et al. | |
| 4,610,429 A | 9/1986 | Arnold et al. | |
| 4,626,005 A | 12/1986 | Stifter | |
| 4,635,673 A | 1/1987 | Gerdes | |
| 4,649,958 A | 3/1987 | Purcell | |

(Continued)

FOREIGN PATENT DOCUMENTS

| | | |
|---|---|---|
| DE | 10133041 | 1/2003 |
| EP | 0632220 | 1/1995 |
| EP | 0808952 | 11/1997 |
| WO | WO 91/05191 | 4/1991 |
| WO | WO 02/25022 | 3/2002 |

OTHER PUBLICATIONS

Price Pfister Kitchen Hanover™ Collection options, undated, 1 pg.
Price Pfister 526 Series Hanover™ Collection Pull-Out Kitchen Faucet Parts Explosion, Sep. 15, 2006, 1 pg.
Price Pfister 526 Series Hanover™ Collection Pull-Out Kitchen Faucet Specification Submittal, Sep. 19, 2006, 1 pg.

*Primary Examiner*—Stephen Hepperle
(74) *Attorney, Agent, or Firm*—Baker & Daniels LLP (57) ABSTRACT

A diverter assembly configured to be connected to a faucet assembly that may be installed on a sink. The diverter assembly includes a diverter and a mechanism for dispensing fluid, such as a sprayer. The diverter assembly may be connected to a tube connected to an outlet of the faucet. The diverter assembly may redirect flow from the outlet of the faucet to the sprayer upon activation of the sprayer.

45 Claims, 7 Drawing Sheets

U.S. PATENT DOCUMENTS

| | | |
|---|---|---|
| 4,754,993 A | 7/1988 | Kraynick |
| 4,760,871 A | 8/1988 | Vijay |
| 4,762,143 A | 8/1988 | Botnick |
| 4,798,221 A | 1/1989 | Crawford et al. |
| 5,027,851 A | 7/1991 | Drees et al. |
| 5,073,991 A | 12/1991 | Marty |
| 5,090,062 A | 2/1992 | Hochstrasser |
| 5,095,554 A | 3/1992 | Gloor |
| 5,100,565 A | 3/1992 | Fujiwara et al. |
| 5,131,428 A | 7/1992 | Bory |
| 5,219,185 A | 6/1993 | Oddenino |
| 5,494,259 A | 2/1996 | Peterson |
| 5,558,128 A | 9/1996 | Pawelzik et al. |
| 5,566,707 A | 10/1996 | Ching et al. |
| 5,573,037 A | 11/1996 | Cole et al. |
| 5,642,755 A | 7/1997 | Mark et al. |
| 5,653,868 A | 8/1997 | Yanou et al. |
| 5,669,417 A | 9/1997 | Lian-Jie |
| 5,685,341 A | 11/1997 | Chrysler et al. |
| 5,687,952 A | 11/1997 | Arnold et al. |
| 5,701,926 A | 12/1997 | Luisi |
| 5,725,008 A | 3/1998 | Johnson |
| 5,746,244 A | 5/1998 | Woolley, Sr. et al. |
| 5,803,120 A | 9/1998 | Bertoli |
| 5,865,473 A | 2/1999 | Semchuck et al. |
| 5,871,029 A | 2/1999 | Peteri et al. |
| 5,881,754 A | 3/1999 | Wei |
| 5,884,662 A | 3/1999 | Ko |
| 5,937,892 A | 8/1999 | Meisner et al. |
| 5,944,225 A | 8/1999 | Kawolics |
| 5,950,663 A | 9/1999 | Bloomfield |
| 5,960,490 A | 10/1999 | Pitsch |
| 5,979,489 A | 11/1999 | Pitsch |
| 6,023,796 A | 2/2000 | Pitsch |
| 6,062,251 A | 5/2000 | Pitsch |
| 6,070,614 A | 6/2000 | Holzheimer et al. |
| 6,073,972 A | 6/2000 | Rivera |
| 6,079,447 A | 6/2000 | Holzheimer et al. |
| 6,085,784 A | 7/2000 | Bloom et al. |
| 6,123,106 A | 9/2000 | Benstead |
| 6,138,296 A | 10/2000 | Baker |
| 6,202,686 B1 | 3/2001 | Pitsch et al. |
| 6,256,810 B1 | 7/2001 | Baker |
| 6,305,407 B1 | 10/2001 | Selby |
| 6,328,059 B1 | 12/2001 | Testori et al. |
| 6,609,732 B1 | 8/2003 | Souvatzidis et al. |
| 6,729,344 B1 | 5/2004 | Hung |
| 6,757,921 B2 | 7/2004 | Esche |
| 6,920,892 B2 | 7/2005 | Agresta et al. |
| 7,000,854 B2 | 2/2006 | Malek et al. |
| 7,077,153 B2 | 7/2006 | Segien, Jr. |
| 7,096,879 B2 | 8/2006 | Yardley |
| 7,121,303 B1 | 10/2006 | Hwang |
| 2002/0167171 A1 | 11/2002 | Becker et al. |
| 2003/0102256 A1 | 6/2003 | Takagi |
| 2004/0011399 A1* | 1/2004 | Segien, Jr. ............. 137/119.01 |
| 2004/0117906 A1 | 6/2004 | Baker et al. |
| 2006/0117477 A1 | 6/2006 | Rosko |
| 2006/0131228 A1 | 6/2006 | Truong |

* cited by examiner

DIVERTER INTEGRATED INTO A SIDE SPRAYER

BACKGROUND AND SUMMARY OF THE INVENTION

The present invention relates to diverters for use with faucets, and more particularly, to a diverter integrated with the side spray of a faucet.

In sinks, the general utilization of a diverter valve that is configured to allow a fluid, such as water, to be diverted from a delivery spout outlet of the faucet to a sprayer is known. The diverter valve is typically configured to automatically divert fluid flow to the sprayer upon activation of the sprayer. When the sprayer is deactivated, the diverter valve automatically diverts fluid flow back to the delivery spout outlet.

In the prior art, U.S. Pat. No. 7,077,153 discloses a side control faucet with a separate diverter valve which may be connected to an outlet of a valve body. The diverter valve may also be connected to both a spout and an auxiliary water dispensing device, such as a side sprayer or a water filtration dispenser. The separate diverter assembly allows for the use of a single valve body on both side spray and non-side spray type faucets.

A need exists for a diverter configured for use with a sprayer or water filtration device that may be added to a faucet assembly, even after the assembly has been installed in a sink.

The present disclosure provides a diverter assembly configured to be connected to a faucet assembly that may be installed on a sink. The diverter assembly includes a diverter and a mechanism for dispensing fluid, such as a sprayer. The diverter assembly may be connected to a tube connected to the outlet of the faucet. The diverter assembly may redirect flow from the outlet of the faucet to the sprayer upon activation of the sprayer.

In one illustrative embodiment of the present disclosure, a sprayer assembly is configured for use with a faucet including a delivery spout outlet and a valve assembly capable of selectively preventing the flow of fluid to the delivery spout outlet, wherein the sprayer assembly includes a sprayer including an inlet, a sprayer outlet and an actuator capable of selectively permitting the flow of fluid from the inlet to the sprayer outlet. A diverter includes a housing, an input, a first output and a second output. A valve outlet tube fluidly connects the valve assembly and the input of the diverter. A spout tube fluidly connects the delivery spout outlet and the second output of the diverter. A sprayer tube fluidly connects the sprayer and the first output of the diverter. The sprayer tube has an end fixed within the housing of the diverter.

In a further illustrative embodiment of the present disclosure, a method of attaching a dispenser assembly to a faucet is provided. The faucet includes a delivery spout outlet, a valve assembly configured to selectively permit flow of the fluid through the outlet, a first tube connecting the valve assembly to a liquid supply, and a second tube connecting the valve assembly to the outlet. The method includes the steps of disconnecting the second tube from between the valve assembly and the outlet, providing a dispenser assembly including an integral diverter having an input and an output, and fluidly coupling the second tube to one of the input and the output of the diverter. The method further includes the step of fluidly coupling a third tube to the other of the output and the input of the diverter, wherein the dispenser assembly further includes a dispenser mechanism capable of selectively dispensing the fluid connected to the diverter.

In another illustrative embodiment of the present disclosure a method of installing a sink includes the steps of adding a delivery spout and a valve assembly to the sink, and coupling a diverter assembly to the valve assembly. The method further includes the step of coupling a sprayer to the valve assembly, wherein the diverter assembly is integral with the sprayer, such that the step of coupling the diverter assembly occurs concurrently with the step of coupling the sprayer assembly.

In another illustrative embodiment of the present disclosure, a sprayer for use with a faucet includes a body defining an inlet and an outlet, a tube having opposing first and second ends, the first end fluidly coupled to the inlet, and a diverter integrally coupled to the second end of the tube.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DESCRIPTION OF EMBODIMENTS OF THE INVENTION

The embodiments of the invention described herein are not intended to be exhaustive or to limit the invention to precise forms disclosed. Rather, the embodiment selected for description have been chosen to enable one skilled in the art to practice the invention. Although the disclosure is described in connection with water, it should be understood that additional types of fluids may be used.

Figure 1:
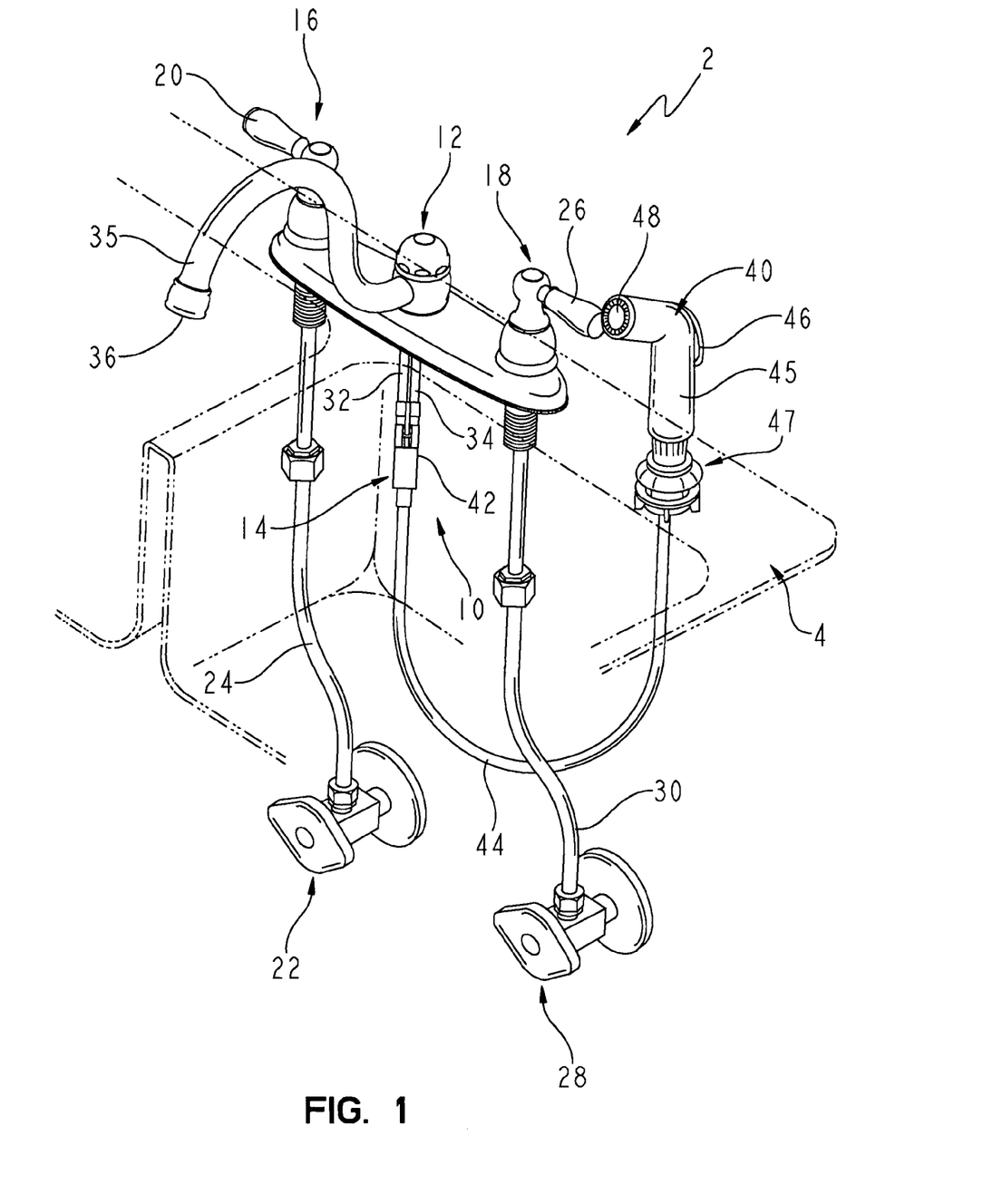
FIG. 1 is a perspective view of a sink supporting an illustrative embodiment of the present disclosure.

Referring first to FIG. 1, a sink assembly, generally indicated by numeral 2, includes an illustrative embodiment of the present disclosure. Sink assembly 2 includes a sink 4 and a faucet and diverter assembly, generally indicated by numeral 10. Faucet and diverter assembly 10 include a faucet assembly 12 and a diverter assembly 14.

Faucet assembly 12 may represent a conventional faucet assembly of the type known in the art. In the depicted embodiment, faucet assembly 12 includes a hot water control valve 16 and a cold water control valve 18. Hot water control valve 16 includes a handle 20 and is connected to a hot water supply valve or stop 22 by a hot water inlet tube 24. Similarly, cold water control valve 18 includes a handle 26 and is connected to a cold water supply valve or stop 28 by a cold water inlet tube 30. Rotation of the handles 20, 26 permit the flow of water supplied by the stops 22, 28 through valves 16, 18. The stops 22, 28 may be connected to any conventional source of water in a known fashion.

Referring still to FIG. 1, faucet assembly 12 further includes a water outlet tube 32. Outlet tube 32 is connected to the valves 16, 18 in a known manner. Tube 32 is configured so as to receive water flowing through the valves 16, 18. The water flowing through valves 16, 18 may be combined or mixed into a single flow through tube 32 in any suitable manner. It should be noted that whenever only one of valves 16, 18 is activated, only the fluid flowing through the activated valve will flow through tube 32. When both valves 16, 18 are activated, the fluid flowing through both valves 16, 18 will be combined and flow through tube 32.

In the depicted embodiment, faucet assembly 10 also includes a tube 34 connected to a delivery spout 35 including an outlet 36. Tube 34 may extend within spout 35 such that any fluid flowing through tube 34 exits outlet 36. In one illustrative embodiment, the tubes 24, 30, 32, 34, and 44 may include certain features, such as corrugated walls for improved flexibility, as detailed in U.S. patent application Ser. No. 11/700,801, filed Jan. 31, 2007, entitled "TUBE ASSEMBLY,", the disclosure of which is expressly incorporated by reference herein. The interconnection between tube 34 and outlet 36 may bei accomplished in any known manner. For instance, the outlet 36 may include an overmold component similar to that detailed in U.S. patent application Ser. No. 11/700,640, filed Jan. 31, 2007, entitled "OVERMOLD INTERFACE FOR FLUID CARRYING SYSTEM,", the disclosure of which is expressly incorporated by reference herein.

With reference still to FIG. 1, in the depicted embodiment, diverter assembly 14 includes a fluid dispenser 40, a diverter 42 and a tube 44. In the present embodiment, fluid dispenser 40 represents a sprayer, or side spray, of the type known in the art, but it should be noted that fluid dispenser 40 may be any type of fluid dispenser known in the art, such as a filtered water dispenser. In the depicted embodiment, sprayer 40 includes a body 45 supporting an actuator button or lever 46, an inlet 47, and an outlet or spray head 48. Sprayer 40 is of the type that depression of actuator button 46 will allow fluid entering sprayer 40 via inlet 47 to exit via outlet 48.

Figure 2:
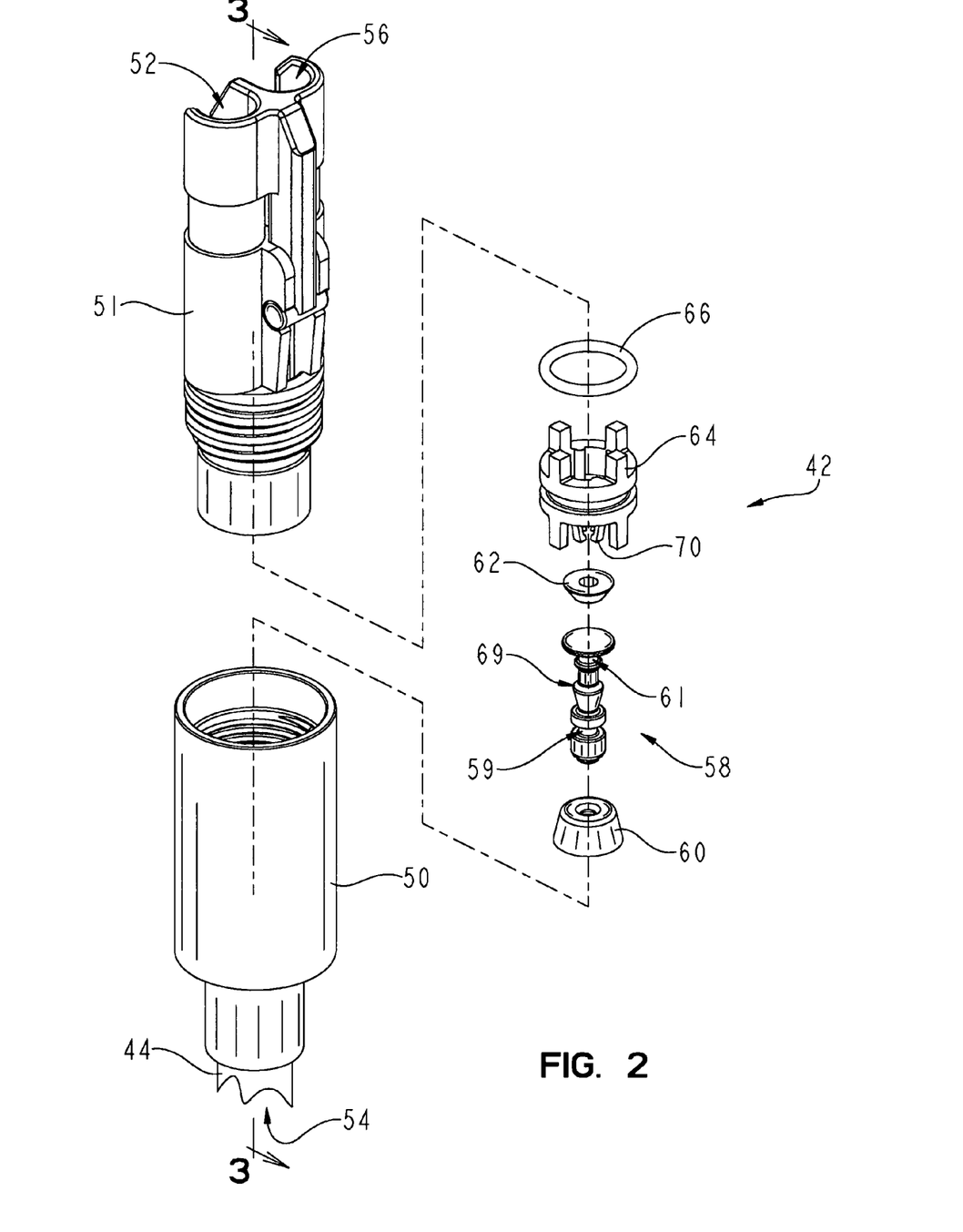
FIG. 2 is an exploded perspective view of a diverter valve utilized in the embodiment of the invention depicted in FIG. 1.
Figure 3:
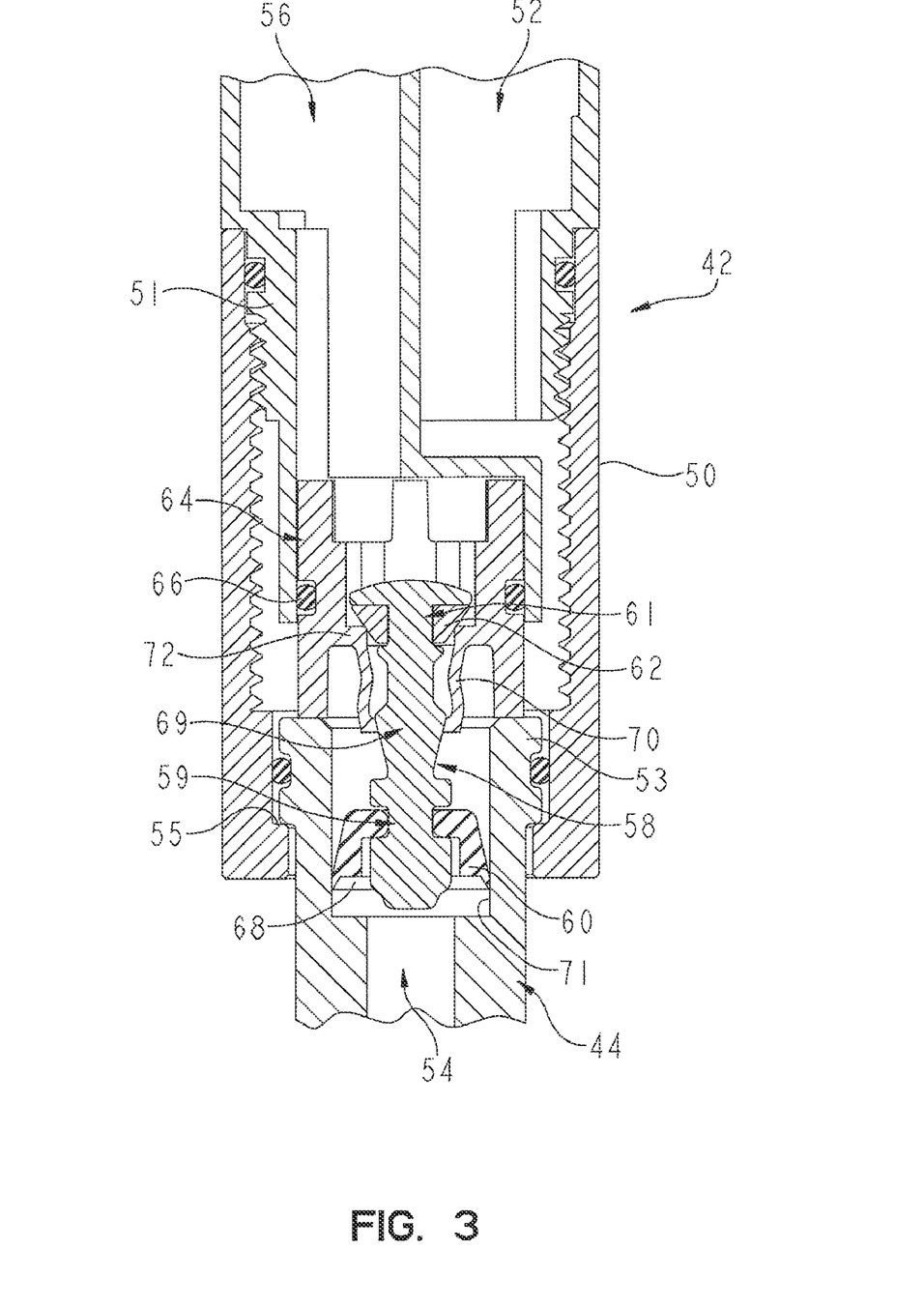
FIG. 3 is a cross sectional view of the diverter valve of FIG. 2 taken along section line 3-3, shown in a no flow state.

FIG. 2 depicts an exploded perspective view of an embodiment of diverter 42, and FIG. 3 depicts a cross-sectional view of diverter 42 taken along the section line 3-3 illustrated in FIG. 2. As depicted in FIG. 3, diverter 42 is in a non-flowing state. It should benoted that diverter 42 is an exemplary embodiment of a diverter and may be replaced with any diverter known in the art, including the diverters described in U.S. Pat. Nos. 4,577,653 and 4,798,221, which are expressly incorporated by reference herein.

In the depicted embodiment, diverter 42 includes an outer housing 50, an inner housing 51, a poppet 58, a first seal 60, a second seal 62, a retaining member 64 and an o-ring 66. Outer housing 50 may be sized and configured to receive inner housing 51, and may be formed of any suitable material. In a further illustrative embodiment, outer housing 50 is integrally coupled to tube 44 at first outlet 54. As shown in FIG. 3, end 53 of tube 44 is captured within outer housing 50 between retaining member 64 and an annular retaining lip 55 of outer housing 50. In addition, any suitable mechanism may be employed to connect the housings 50, 51 such as, threads, for example. Inner housing 51, in turn, retains the retaining member 64 within outer housing 50. The combination of the housings 50, 51 includes an inlet 52, a first outlet 54 and a second outlet 56.

Referring still to FIG. 2, poppet 58 may be manufactured from any suitable material, such as an elastomer, for example. Poppet 58 includes a first neck portion 59, sized and configured to receive seal 60, and a second neck portion 61, sized and configured to receive seal 62. The seal 62 may also be formed from any suitable material, such as an elastomer, for example.

Retaining member 64 may also be formed from any suitable material, such as brass. Member 64 is sized to receive o-ring 66, which may be formed of any suitable material, such as an elastomer.

FIG. 3 depicts a view of diverter 42 in a non-flowing state taken along section line 3-3 in FIG. 2. In FIG. 3, no fluid is entering the diverter via inlet 52, or conversely, fluid flow is prevented downstream from outlets 54, 56, thereby creating a pressure buildup at the outlets 54, 56. As shown in FIG. 3, when diverter 42 is assembled, seals 60, 62 are attached to necks 59, 61, respectively, of poppet 58. As illustrated in FIG. 3, seal 60 includes a flexible skirt indicated by numeral 68. In addition, angled portion 69 of poppet 58 is retained by a plurality of fingers 70 formed in retaining member 64.

As illustrated by FIG. 3, if no fluid is flowing into diverter 42 via inlet 52, the skirt 68 of seal 60 seals against the surface of wall 71. In this manner, seal 60 acts as a check valve whereby reverse flow of fluid is prevented into diverter 42 from first outlet 54. Similarly, the upper portion of poppet 58, in conjunction with seal 62, seals against shoulder portion 72 of retaining member 64. In this manner, seal 62 acts as a check valve preventing reverse flow of fluid into diverter 42 from second output 56.

Figure 4:
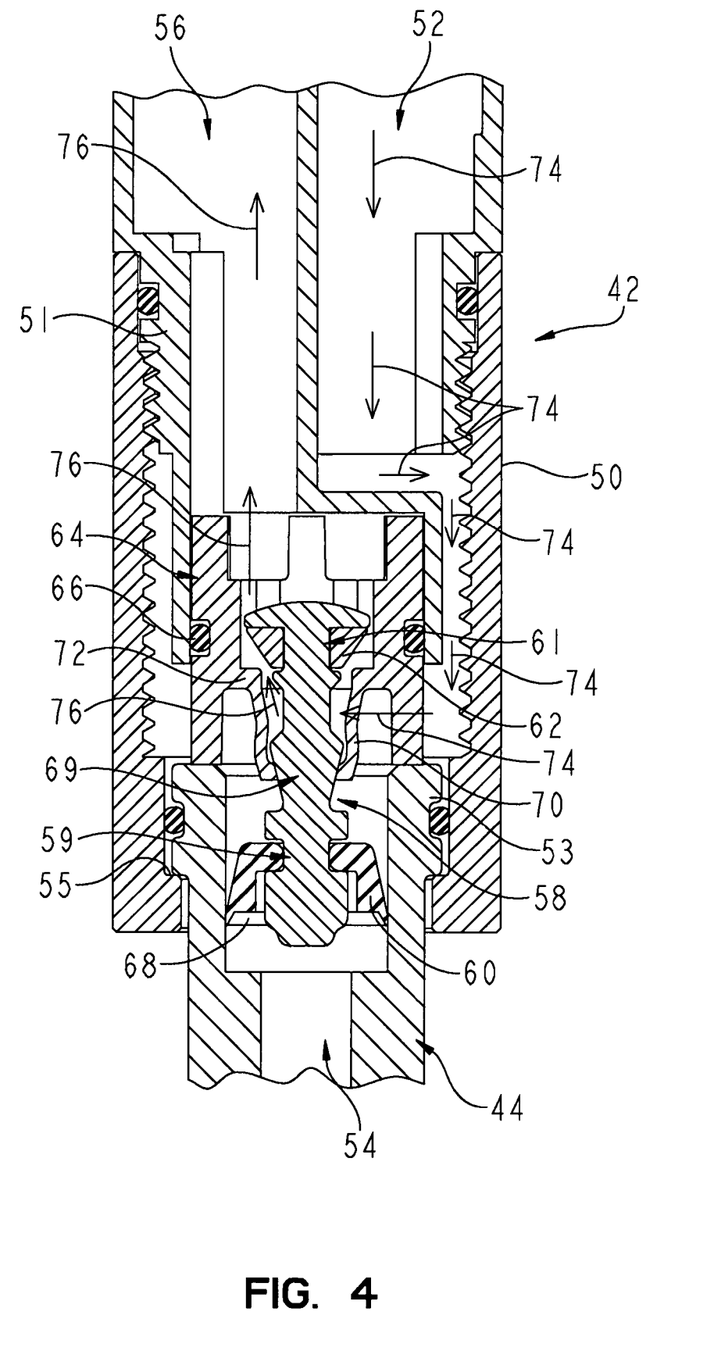
FIG. 4 is a cross sectional view of the diverter valve of FIG. 3, shown in a first flow state.

FIG. 4 depicts a section view of diverter 42 in a first flow state, wherein fluid flows into diverter 42 via input 52, but downstream flow of fluid via tube 44 is prevented. As can be seen, the fluid entering diverter 42 follows the path of arrows 74, wherein the fluid will traverse inlet 52 and encounter the chamber housing poppet 58 intermediate the seals 60, 62. In the depicted embodiment, flow of fluid through outlet 54 is prevented downstream, and thus a buildup of fluid pressure at seal 60 occurs at outlet 54. Accordingly, the pressure of the fluid will cause poppet 58 to move in a direction separating seal 62 from shoulder portion 72. As the seal 62 moves away from shoulder portion 72, fluid may follow the path indicated by arrows 76 and flow around seal 62, eventually exiting diverter 42 via outlet 56. Liquid continues to flow through tube 34 and to outlet 36 of spout 35.

Figure 5:
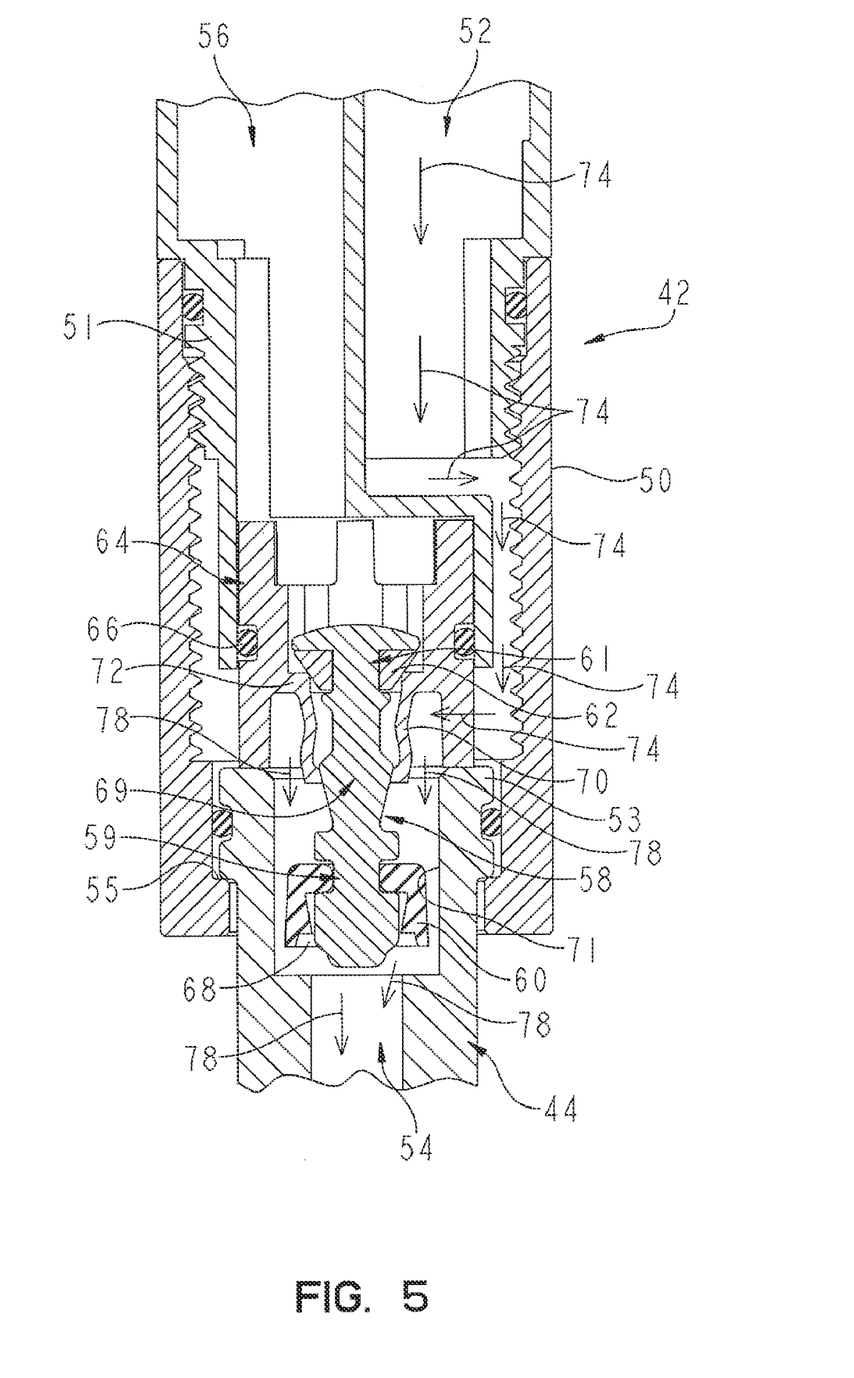
FIG. 5 is a cross sectional view of the valve of FIG. 3, shown in a second flow state.

FIG. 5 depicts a section view of diverter 42 as arranged when fluid is entering diverter 42 via inlet 52, and the fluid is free to exit tube 44 downstream of outlet 54. In the depicted view, fluid traverses inlet 52 along the arrows indicated by numeral 74. When the fluid is able to exit tube 44, no pressure buildup of fluid occurs at outlet 54, as described above. Accordingly, skirt 68 of seal 60 may move away from wall 71, thereby allowing fluid to travel around seal 60. Specifically, the fluid will follow the path indicated by arrows 78 and exit diverter 42 via outlet 54. Liquid continues to flow through tube 44 and to outlet 48 of sprayer 40. It should be noted that during this process, seal 62 remains seated upon shoulder portion 72 of member 64 and prevents fluid from exiting diverter 42 through outlet 56.

Referring now to FIGS. 1 through 5, rotation of one or both handles 20, 26 opens corresponding valves 16, 18, thereby causing water to flow into diverter 42 from tube 32. If the button 46 of dispenser 40 is not depressed, water is prevented from exiting outlet 48. Accordingly, fluid is prevented from exiting diverter 42 from first outlet 54, and pressure will begin to build, as described above. Thus, diverter 42 will be oriented as shown in FIG. 4 and water will flow through outlet 54 and into tube 34. From tube 34, the water may exit the faucet and diverter assembly 10 through nozzle 36.

With water still flowing through tube 34, whenever button 46 of dispenser 40 is depressed, water may exit dispenser 40 via outlet 48. Accordingly, pressure proximate outlet 54 is lowered, and diverter 42 may be oriented as depicted in FIG. 5, with water flowing through outlet 54 and into tube 44. From tube 44, the water enters fluid dispenser 40 at inlet 47 and then exits dispenser 40 through outlet 48. Upon release of the button 46, the fluid may no longer exit fluid dispenser 40 through outlet 48, and diverter 42 will return to the state depicted in FIG. 4 with water flowing out of nozzle 36. Once the handles 20, 26 are rotated to close valves 16, 18, diverter 42 returns to the state depicted in FIG. 3.

It should be noted that diverter assembly 14 may be added to a faucet assembly 12 as a retrofit component. For example, faucet assembly 12 may be originally assembled with tube 32 connected directly to tube 34. In an instance such as this, one may add a diverter assembly 14 by separating the tubes 32, 34 and connecting the tubes 32, 34 to inlet 52 and second outlet 56, respectively, of diverter 42.

Figure 6:
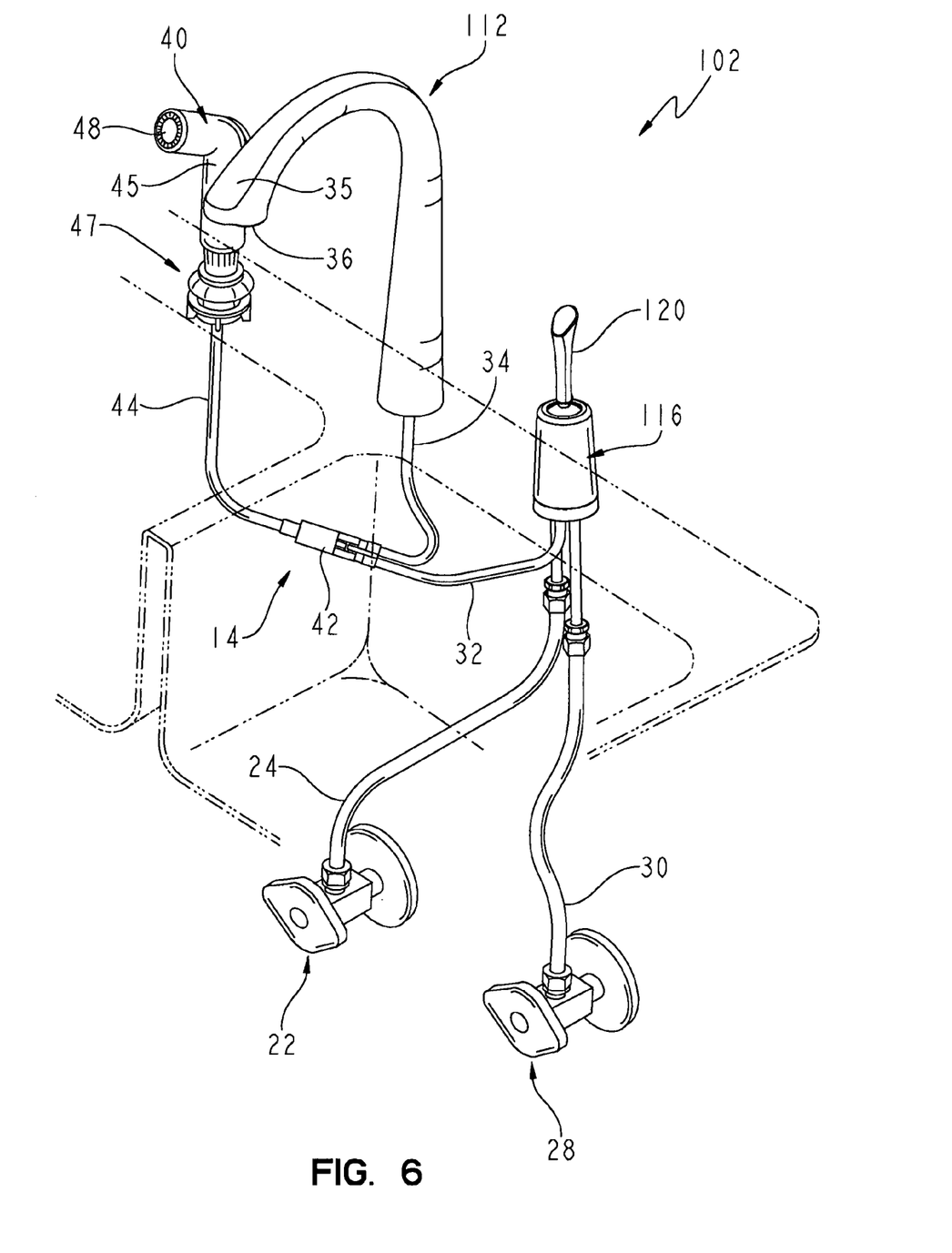
FIG. 6 is a perspective view of a sink supporting a further illustrative embodiment of the present disclosure.

FIG. 6 depicts another embodiment sink assembly 102 including a faucet assembly 112. With respect to the description of sink assembly 102, components common to the previous embodiment are identified with the same reference numerals. In the embodiment of sink assembly 102 depicted, diverter assembly 14 is the same embodiment as that described previously. Faucet assembly 112 includes a single valve assembly 116 including a single handle 120. Valve assembly 116 is configured to be connected to both the hot water inlet tube 24 and the cold water inlet tube 30. Upon movement of handle 120 in a known manner, valve assembly 116 allows some mixture of fluid from the tubes 24, 30 to combine and flow into water outlet tube 32 in a known manner. From tube 32, the fluid flows into diverter 42 as described above. Other than the function of valve 120, sink assembly 102 functions substantially similar to sink assembly 2 described above.

Figure 7:
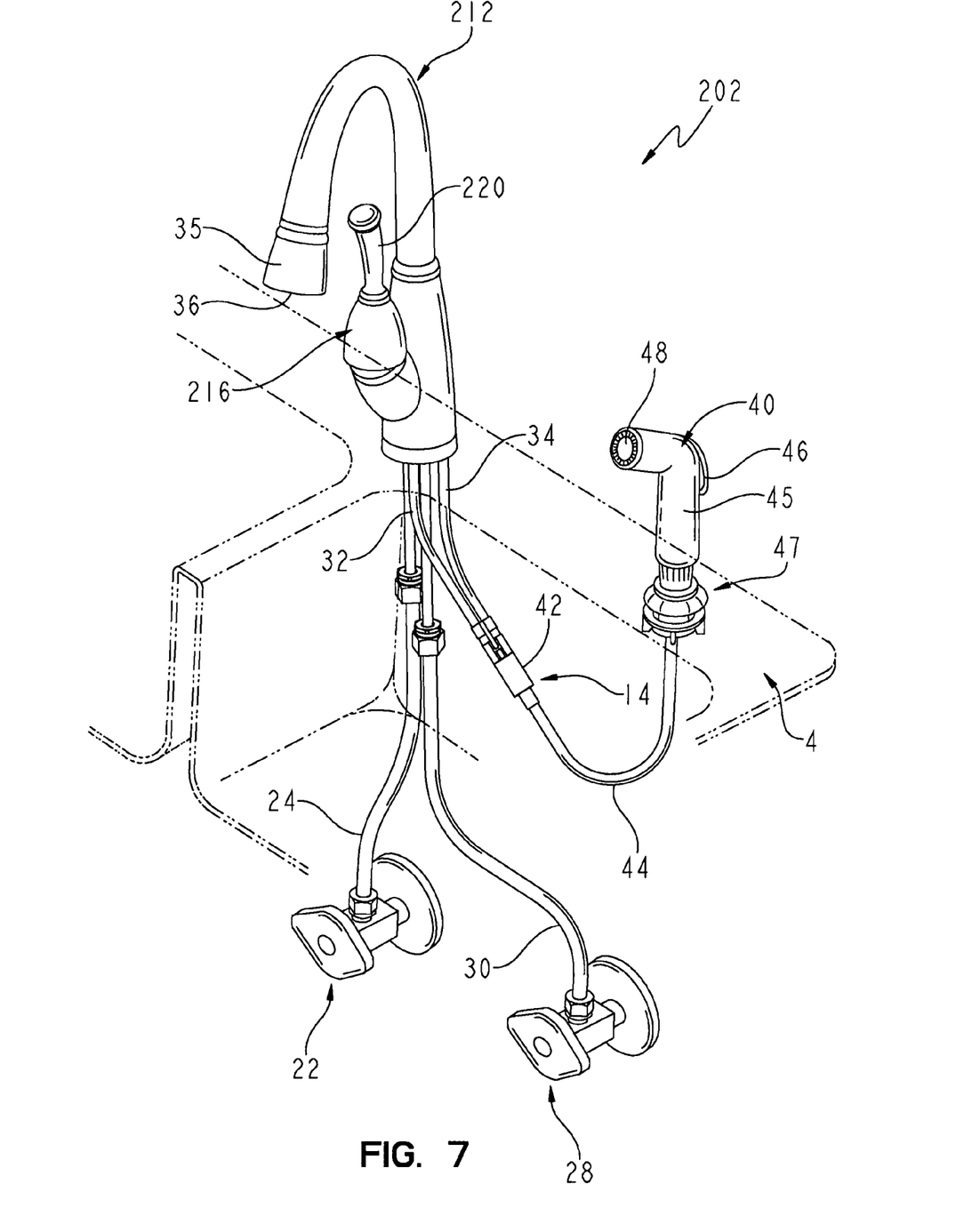
FIG. 7 is a perspective view of a sink supporting another illustrative embodiment of the present disclosure.

FIG. 7 depicts another embodiment of a sink assembly 202 including a faucet assembly 212. With respect to the description of sink assembly 202, components common to the previous embodiments are identified with the same reference numerals. In the embodiment of sink assembly 202 depicted, diverter assembly 14 is the same embodiment as that described previously. Sink assembly 202 includes a faucet assembly 202 including a valve 216 positioned proximate outlet 36. Valve assembly 216 includes a handle 220 and is capable of combining fluid flow from water inlet tubes 24, 30 into a single flow traveling through water outlet tube 32. In a manner similar to that set forth in previous embodiments, tube 32 is connected to diverter assembly 14. Thus, diverter 42 may divert fluid to dispenser 40 by way of diverter 42 in the manner described previously. Thus, in the embodiments depictured in FIGS. 6 and 7, the functionality of the embodiment is the same as that of the embodiment of FIG. 1, once the fluid reaches diverter 42. It should be noted that in the embodiments depicted in FIGS. 6 and 7, the diverter assembly 14 may be added to the faucet assembly 112, 212 in a retro fit fashion, as described above.

While this invention has been described as having a exemplary designs, the present invention may be further modified within the spirit and scope of the disclosure. This application is therefore intended to cover any variations, uses, or adaptations of the invention using its general principles. Further, this application is intended to cover such departures from the present disclosure as come within known or customary practice in the art to which this invention pertains including variations and modifications existing within the spirit and scope of the invention as described and defined in the following claims.

The invention claimed is:

1. A sprayer and faucet assembly configured for use with a faucet including a delivery spout outlet and a valve assembly capable of selectively preventing the flow of fluid to the delivery spout outlet, the sprayer and faucet assembly comprising;

a sprayer including a sprayer inlet, a sprayer outlet and an actuator capable of selectively permitting the flow of fluid from said sprayer inlet to said sprayer outlet;

a diverter including an outer housing, an inner housing received within said outer housing, an input, a first output and a second output;

a valve outlet tube fluidly connecting the valve assembly and said input of said diverter;

a spout tube fluidly connecting the delivery spout outlet and said second output of said diverter; and a sprayer tube having opposing first and second ends, said first end rigidly fixed to said sprayer at said sprayer inlet and said second end rigidly fixed intermediate said outer housing and said inner housing of said diverter at said first output of said diverter, wherein said outer housing of said diverter defines said inlet and said second output, and said inlet is positioned adjacent said second output.

2. The assembly as set forth in claim 1, wherein said diverter permits the fluid to flow from said input to said second output until activation of said actuator of said sprayer.

3. The assembly of claim 1, wherein said inlet, said first output, and said second output extend parallel to a longitudinal axis of said outer housing of said diverter.

4. The assembly of claim 1, wherein said inlet and said second output extend adjacent to each other from the first end of said outer housing of said diverter.

5. A sprayer and faucet assembly configured for use with a faucet including a delivery spout outlet and a valve assembly capable of selectively preventing the flow of fluid to the delivery spout outlet, the sprayer and faucet assembly comprising;

a sprayer including a sprayer inlet, a sprayer outlet and an actuator capable of selectively permitting the flow of fluid from said sprayer inlet to said sprayer outlet;

a diverter including an outer housing, an inner housing received within said outer housing, an input, a first output and a second output;

a valve outlet tube fluidly connecting the valve assembly and said input of said diverter;

a spout tube fluidly connecting the delivery spout outlet and said second output of said diverter; and a sprayer tube having opposing first and second ends, said first end rigidly fixed to said sprayer at said sprayer inlet and said second end rigidly fixed intermediate said outer housing and said inner housing of said diverter at said first output of said diverter, wherein said diverter includes a first end and a second end, wherein said inlet is located proximate said first end and said first output is located proximate said second end.

6. The assembly of claim 5, wherein said inlet, said first output, and said second output extend parallel to a longitudinal axis of said outer housing of said diverter.

7. The assembly of claim 6, wherein said inlet and said second output extend adjacent to each other from the first end of said outer housing of said diverter.

8. The assembly as set forth in claim 5, wherein said diverter permits the fluid to flow from said input to said second output until activation of said actuator of said sprayer.

9. A sprayer and faucet assembly configured for use with a faucet including a delivery spout outlet and a valve assembly capable of selectively preventing the flow of fluid to the delivery spout outlet, the sprayer and faucet assembly comprising;
a sprayer including a sprayer inlet, a sprayer outlet and an actuator capable of selectively permitting the flow of fluid from said sprayer inlet to said sprayer outlet;
a diverter including an outer housing, an inner housing received within said outer housing, an input, a first output and a second output;
a valve outlet tube fluidly connecting the valve assembly and said input of said diverter;
a spout tube fluidly connecting the delivery spout outlet and said second output of said diverter;
a sprayer tube having opposing first and second ends, said first end rigidly fixed to said sprayer at said sprayer inlet and said second end rigidly fixed intermediate said outer housing and said inner housing of said diverter at said first output of said diverter; and
a retainer operably coupled intermediate said outer housing and said inner housing and configured to secure said sprayer tube within said first output of said diverter.

10. The assembly of claim 9, wherein said diverter further includes a seal received within said sprayer tube and configured to selectively seal against an inner surface of said sprayer tube.

11. The assembly of claim 10, wherein said diverter further includes a poppet supporting said seal for selective axial movement within said sprayer tube.

12. The assembly of claim 9, wherein said inlet, said first output, and said second output extend parallel to a longitudinal axis of said outer housing of said diverter.

13. The assembly of claim 9, wherein said inlet and said second output extend adjacent to each other from the first end of said outer housing of said diverter.

14. A sprayer for use with a faucet including:
a sprayer body defining an inlet, an outlet, and an actuator capable of selectively permitting the flow of fluid from said inlet to said outlet;
a sprayer tube having opposing first and second ends, said first end fluidly coupled to said inlet; and
a diverter having an outer housing, an inner housing received within said outer housing, an input, a first output, and a second output, wherein said second end of said sprayer tube is rigidly fixed to said diverter at said first output intermediate said outer housing and said inner housing, wherein said diverter includes a first end and a second end, wherein said input and said second output are located proximate said first end and said first output is located proximate said second end.

15. The sprayer of claim 14, wherein said diverter permits the fluid to flow from said input to said second output until activation of said actuator of said sprayer.

16. The sprayer of claim 14, wherein said inlet, said first output, and said second output extend parallel to a longitudinal axis of said outer housing of said diverter.

17. The sprayer of claim 16, wherein said inlet and said second output extend adjacent to each other from the first end of said outer housing of said diverter.

18. A sprayer for use with a faucet including:
a sprayer body defining an inlet, an outlet, and an actuator capable of selectively permitting the flow of fluid from said inlet to said outlet;
a sprayer tube having opposing first and second ends, said first end fluidly coupled to said inlet;
a diverter having an outer housing, an inner housing received within said outer housing, an input, a first output, and a second output, wherein said second end of said sprayer tube is rigidly fixed to said diverter at said first output intermediate said outer housing and said inner housing; and
a retainer operably coupled intermediate said outer housing and said inner housing and configured to secure said sprayer tube within said first output of said diverter.

19. The sprayer of claim 18, wherein said diverter further includes a seal received within said sprayer tube and configured to selectively seal against an inner surface of said sprayer tube.

20. The sprayer of claim 19, wherein said diverter further includes a poppet supporting said seal for selective axial movement within said sprayer tube.

21. A sprayer for use with a faucet including:
a sprayer body defining an inlet, an outlet, and an actuator capable of selectively permitting the flow of fluid from said inlet to said outlet;
a sprayer tube having opposing first and second ends, said first end fluidly coupled to said inlet;
a diverter having an outer housing, an input, a first output, and a second output, wherein said sprayer tube is rigidly fixed to said diverter at said first output, said diverter further including a seal received within said sprayer tube and configured to selectively seal against an inner surface of said sprayer tube, wherein said diverter further includes an inner housing received within said outer housing, wherein said sprayer tube is rigidly fixed to said diverter at said first output intermediate said outer housing and said inner housing; and
a retainer operably coupled intermediate said outer housing and said inner housing and configured to secure said sprayer tube within said first output of said diverter.

22. The sprayer of claim 21, wherein said diverter further includes a poppet supporting said seal for selective axial movement within said sprayer tube.

23. A sprayer for use with a faucet including:
a sprayer body defining an inlet, an outlet, and an actuator capable of selectively permitting the flow of fluid from said inlet to said outlet;
a sprayer tube having opposing first and second ends, said first end fluidly coupled to said inlet; and
a diverter having an outer housing, an input, a first output, and a second output, wherein said sprayer tube is rigidly fixed to said diverter at said first output, said diverter further including a seal received within said sprayer tube and configured to selectively seal against an inner surface of said sprayer tube, wherein said diverter includes a first end and a second end, wherein said inlet is located proximate said first end and said first output is located proximate said second end.

24. The sprayer of claim 23, wherein said inlet, said first output, and said second output extend parallel to a longitudinal axis of said outer housing of said diverter.

25. A fluid dispenser and faucet assembly configured for use with a faucet including a delivery spout outlet and a valve assembly capable of selectively preventing the flow of fluid to the delivery spout outlet, the fluid dispenser and faucet assembly comprising;

a fluid dispenser including a fluid dispenser inlet, a fluid dispenser outlet and an actuator capable of selectively permitting the flow of fluid from said fluid dispenser inlet to said fluid dispenser outlet;

a diverter including an outer housing, an inner housing received within said outer housing, an input, a first output and a second output;

a valve outlet tube fluidly connecting the valve assembly and said input of said diverter;

a spout tube fluidly connecting the delivery spout outlet and said second output of said diverter; and a fluid dispenser tube having opposing first and second ends, said first end rigidly fixed to said fluid dispenser at said fluid dispenser inlet and said second end rigidly fixed intermediate said outer housing and said inner housing of said diverter at said first output of said diverter, wherein said outer housing of said diverter defines said inlet and said second output, and said inlet is positioned adjacent said second output.

26. The assembly of claim 25, wherein the fluid dispenser is spaced apart from the spout tube.

27. The assembly of claim 25, wherein the fluid dispenser is a sprayer.

28. A fluid dispenser and faucet assembly configured for use with a faucet including a delivery spout outlet and a valve assembly capable of selectively preventing the flow of fluid to the delivery spout outlet, the fluid dispenser and faucet assembly comprising;

a fluid dispenser including a fluid dispenser inlet, a fluid dispenser outlet and an actuator capable of selectively permitting the flow of fluid from said fluid dispenser inlet to said fluid dispenser outlet;

a diverter including an outer housing, an inner housing received within said outer housing, an input, a first output and a second output;

a valve outlet tube fluidly connecting the valve assembly and said input of said diverter;

a spout tube fluidly connecting the delivery spout outlet and said second output of said diverter; and a fluid dispenser tube having opposing first and second ends, said first end rigidly fixed to said fluid dispenser at said fluid dispenser inlet and said second end rigidly fixed intermediate said outer housing and said inner housing of said diverter at said first output of said diverter, wherein said diverter includes a first end and a second end, wherein said inlet is located proximate said first end and said first output is located proximate said second end.

29. The assembly of claim 28, wherein the fluid dispenser is spaced apart from the spout tube.

30. The assembly of claim 29, wherein the fluid dispenser is a sprayer.

31. A fluid dispenser and faucet assembly configured for use with a faucet including a delivery spout outlet and a valve assembly capable of selectively preventing the flow of fluid to the delivery spout outlet, the fluid dispenser and faucet assembly comprising;

a fluid dispenser including a fluid dispenser inlet, a fluid dispenser outlet and an actuator capable of selectively permitting the flow of fluid from said fluid dispenser inlet to said fluid dispenser outlet;

a diverter including an outer housing, an inner housing received within said outer housing, an input, a first output and a second output;

a valve outlet tube fluidly connecting the valve assembly and said input of said diverter;

a spout tube fluidly connecting the delivery spout outlet and said second output of said diverter;

a fluid dispenser tube having opposing first and second ends, said first end rigidly fixed to said fluid dispenser at said fluid dispenser inlet and said second end rigidly fixed intermediate said outer housing and said inner housing of said diverter at said first output of said diverter; and a retainer operably coupled intermediate said outer housing and said inner housing and configured to secure said fluid dispenser tube within said first output of said diverter.

32. The assembly of claim 31, wherein the fluid dispenser is spaced apart from the spout tube.

33. The assembly of claim 32, wherein the fluid dispenser is a sprayer.

34. A fluid dispenser for use with a faucet including:

a fluid dispenser body defining an inlet, an outlet, and an actuator capable of selectively permitting the flow of fluid from said inlet to said outlet;

a fluid dispenser tube having opposing first and second ends, said first end fluidly coupled to said inlet; and a diverter having an outer housing, an inner housing received within said outer housing, an input, a first output, and a second output, wherein said second end of said fluid dispenser tube is rigidly fixed to said diverter at said first output intermediate said outer housing and said inner housing, wherein said diverter includes a first end and a second end, wherein said input and said second output are located proximate said first end and said first output is located proximate said second end.

35. The fluid dispenser of claim 34, wherein the fluid dispenser is spaced apart from a spout tube of the faucet.

36. The fluid dispenser of claim 35, wherein the fluid dispenser is a sprayer dispenser.

37. A fluid dispenser for use with a faucet including:

a fluid dispenser body defining an inlet, an outlet, and an actuator capable of selectively permitting the flow of fluid from said inlet to said outlet;

a fluid dispenser tube having opposing first and second ends, said first end fluidly coupled to said inlet;

a diverter having an outer housing, an inner housing received within said outer housing, an input, a first output, and a second output, wherein said second end of said sprayer tube is rigidly fixed to said diverter at said first output intermediate said outer housing and said inner housing; and a retainer operably coupled intermediate said outer housing and said inner housing and configured to secure said fluid dispenser tube within said first output of said diverter.

38. The fluid dispenser of claim 37, wherein the fluid dispenser is spaced apart from a spout tube of the faucet.

39. The fluid dispenser of claim 38, wherein the fluid dispenser is a sprayer.

40. A fluid dispenser for use with a faucet including:

a fluid dispenser body defining an inlet, an outlet, and an actuator capable of selectively permitting the flow of fluid from said inlet to said outlet;

a fluid dispenser tube having opposing first and second ends, said first end fluidly coupled to said inlet;

a diverter having an outer housing, an input, a first output, and a second output, wherein said fluid dispenser tube is rigidly fixed to said diverter at said first output, said diverter further including a seal received within said sprayer tube and configured to selectively seal against an inner surface of said fluid dispenser tube, wherein said diverter further includes an inner housing received within said outer housing, wherein said fluid dispenser tube is rigidly fixed to said diverter at said first output intermediate said outer housing and said inner housing; and a retainer operably coupled intermediate said outer housing and said inner housing and configured to secure said fluid dispenser tube within said first output of said diverter.

41. The fluid dispenser of claim 40, wherein the fluid dispenser is spaced apart from a spout tube of the faucet.

42. The fluid dispenser of claim 41, wherein the fluid dispenser is a sprayer.

43. A fluid dispenser for use with a faucet including:

a fluid dispenser body defining an inlet, an outlet, and an actuator capable of selectively permitting the flow of fluid from said inlet to said outlet;

a fluid dispenser tube having opposing first and second ends, said first end fluidly coupled to said inlet; and a diverter having an outer housing, an input, a first output, and a second output, wherein said fluid dispenser tube is rigidly fixed to said diverter at said first output, said diverter further including a seal received within said fluid dispenser tube and configured to selectively seal against an inner surface of said fluid dispenser, wherein said diverter includes a first end and a second end, wherein said inlet is located proximate said first end and said first output is located proximate said second end.

44. The fluid dispenser of claim 43, wherein the fluid dispenser is spaced apart from a spout tube of the faucet.

45. The fluid dispenser of claim 44, wherein the fluid dispenser is a sprayer.

* * * * *